United States Patent

[11] 3,575,573

[72] Inventors Jon D. McCollister
Mentor;
John E. Carroll, Lyndhurst, Ohio
[21] Appl. No. 738,478
[22] Filed June 20, 1968
[23] Continuation-in-part of Ser. No. 652,204, Jul. 10, 1967, Pat. No. 3,502,897.
[45] Patented Apr. 20, 1971
[73] Assignee The Lincoln Electric Company
Cleveland, Ohio

[54] METHOD OF AND POWER SUPPLY FOR ELECTRIC ARC WELDING
20 Claims, 5 Drawing Figs.
[52] U.S. Cl....................................................... 219/135, 219/137
[51] Int. Cl....................................................... B23k 9/10
[50] Field of Search............................................ 219/131, 137, 135

[56] References Cited
UNITED STATES PATENTS
3,051,828 8/1962 Manz............................. 219/131
3,180,969 6/1965 Williams........................ 219/137
FOREIGN PATENTS
784,787 10/1957 Great Britain................. 219/131

*Primary Examiner*—J. V. Truhe
*Assistant Examiner*—George A. Montanye
*Attorney*—Meyer, Tilberry & Body ABSTRACT: Electric arc power supply for automatic arc welding of the drop transfer type with a small diameter electrode comprising a principal and supplementary DC power source in parallel wherein the principal power source has a short circuit rate of current rise less than 60,000 amperes per second and the supplementary power supply has a short circuit rate of current rise greater than 60,000 amperes per second. The principal source supplies current at all times. The supplementary source furnishes no or low current during arcing but when the drop contacts the weld pool and short circuits the power supply, the supplementary source supplies a brief pulse of current sufficient to very rapidly break the short circuit and reestablish the arc.

METHOD OF AND POWER SUPPLY FOR ELECTRIC ARC WELDING

METHOD OF AND POWER SUPPLY FOR ELECTRIC ARC WELDING

This application is a continuation-in-part of out copending U.S. Ser. No. 652,204 filed July 10, 1967, now Pat. No. 3,502,897.

This invention pertains to the art of electric arc welding and, more particularly, to a method of electric arc welding, and a power supply for carrying out such method.

The invention is particularly applicable to out-of-position automatic and semiautomatic electric arc welding of metals using relatively small diameter electrodes, and will be described with particular reference thereto, although it will be appreciated that the invention has other and broader applications.

By "automatic welding" is meant feeding a welding electrode of indefinite length past an electric contact forming part of a welding head toward the workpiece to be welded. The contact is usually spaced anywhere from ¼ inch to 1¾ inch from the workpiece, although it can be more. The portion between the contact and the electrode end is referred to herein as the "electrode extension." The electrode may have any diameter but the invention is primarily applicable to electrodes having a current carrying cross section between 0.0005 square inches and 0.0050 square inches; either cored electrode or solid electrode.

By "out-of-position welding" is meant welding in other than the downhand position, e.g. either vertical or overhead. Such welding presents a problem in that the weld pool must remain rather small and not be heated too much above the melting temperature of the metal of the workpiece. If it is, the molten metal becomes too liquid and runs out of the weld pool. Furthermore, some means other than gravity must be employed to move the metal from the electrode end to the molten weld pool.

The invention is usable with either cored or solid electrodes. The protection of the weld resulting from the melting and vaporization of the core, coating or granular flux; gas shielding either $CO_2$, inert gas, or mixtures of inert and active gases, do not diminish the effectiveness of the invention.

BACKGROUND

In the art of arc welding, metal is transferred from the electrode to the workpiece by one of two general mechanisms. The first is when a molten droplet forms on the end of the electrode, breaks off and transfers by free flight from the electrode end to the workpiece. This is called "spray transfer." Spray transfer is usually characterized by a continuous high current sufficient to pinch off the molten droplets on the electrode end as rapidly as they are formed. This high arc current is unsatisfactory for out-of-position welding because the high heat generated by the arc makes the weld pool too hot and thus too liquid. Also in out-of-position welding, transfer of the metal from the electrode to the weld pool is inefficient. The other mechanism is where the molten droplet forms on the end of the electrode, contacts the weld pool, breaks off and is drawn into the weld pool by the surface tension of the molten metals. This is called "drop transfer." The present invention deals with this drop transfer mode of metal transfer to the molten weld pool.

The drop transfer method creates certain problems because at the instant the droplet contacts the weld pool, a short circuit is made across the power source which continues until the droplet is separated from the electrode. High speed movies indicate that during this moment the arc goes out. When the droplet breaks away, the arc is reestablished and the sequence repeats itself.

High speed oscillograms using a constant voltage power source reveal that the instantaneous currents and voltages are quite different from that shown by the typical d'Arsonval ammeter or voltmeter. These oscillograms indicate that while there is an arc, the current decays exponentially from 300—400 amperes to 50—80 amps. and the heat from the arc melts both the workpiece to form the weld pool and the electrode end to form the molten droplet. When the droplet touches the weld pool, the resultant short circuit causes the voltage across the arc to instantaneously drop to essentially zero and the current rises exponentially to a much higher value determined by the parameters of the welding circuit. This current rapidly heats both the droplet and the electrode extension until finally some portion of this droplet or the extension breaks away like a fuse at which time the arc gap is reestablished. The minimum current at which this fuse break occurs is, of course, dependent somewhat on the current carrying area of the electrode, being on the order of 300 amperes for an area on the order of 0.0008 square inches and somewhat greater for an electrode having a current carrying area in the order of 0.005 square inches. The current now falls exponentially toward a value determined by the rate of wire feed and other parameters of the circuit. These oscillograms also show that the rapid drop in current when the arc gap is reestablished generates a voltage in the inductance of the power source which voltage is additive to the power source open circuit voltage and appears across the new arc gap. This "inductive voltage," being generated by the rate of change of the current, also decays exponentially with the decay in the current in the arc gap.

The short circuit current rate of rise, the maximum current which is reached before the arc is reestablished, and the rate of decay of the current when the arc gap is reestablished all have a substantial effect on the ability to obtain satisfactory welds under varying conditions and particularly in out-of-position.

If the rate of rise of the current when the droplet shorts to the weld pool is relatively low, then during the time required for the current to rise to a value necessary to cause the fuse break, the electrode extension also has time to heat and the break may occur in this extension rather than in the molten droplet. When the break occurs in the extension, the new end of the electrode is removed further from the weld pool than it would have been if the break had occurred in the droplet and a longer time is required for the next short circuit to occur. Also, this longer time results in the molten droplet that forms on the end of this advancing electrode being much larger than it would have been if the break had occurred closer to the weld pool. Also, the arcing time is increased resulting in a higher heat input to the weld pool.

It can be noted at this point that this problem of a low rate of rise only exists with the small diameter electrodes as used in semiautomatic welding. With stick welding the electrode diameter is substantially greater and is much more able to carry the short circuit current without the fuse break occurring in the electrode wire itself.

If the maximum current is too high, then when the fuse break occurs, it does so with an explosive effect, sometimes sufficient to blast the molten metal out of the weld pool, but, in any event, creating spatter which is not only wasteful of valuable weld metal but is unsightly and difficult to clean up. Also, a high maximum current results in a higher average current during the arcing period.

This maximum current reached before the fuse break occurs, together with the rate of decay of the current after the arc gap is reestablished, together with the length of time before the next short circuit occurs determine the average arc current. If the maximum current is high and the rate of decay is slow, the average arc current is high. A high average arc current unduly heats the weld pool making it so molten that in out-of-position welding the metal will flow out of the pool and no weld or an inferior weld results.

The desiderata which determines the rate of rise of the current and the rate of decay are determined primarily by the inductance either internal or supplementary, or both, of the power source. Thus, if the inductance is relatively high, the rate of current rise and decay is relatively low and the average current during the arc period will be relatively high. If the inductance is low, the rate of current rise and decay will be much faster and the average current during the arc period will be much lower.

These desiderata are easily illustrated by reference to FIGS. 1 and 2 of the drawings which are oscillograms of the currents and voltages plotted against time of a 0.035 inch electrode advancing at the same constant rate toward a workpiece energized by a constant voltage power source having an open circuit voltage of 18 volts and a short circuit rate of current rise for FIG. 1 of approximately 70,000 amperes per second and for FIG. 2 of approximately 100,000 amperes per second.

In FIG. 1, curves $a$ and $b$ are the instantaneous voltages and currents respectively. Curves $a$ and $b$ show that just before the short circuit the arc voltage is approximately 24 volts and the current 100 amperes. At the moment of short circuit, the voltage drops to approximately zero and the arc current rises exponentially to 300 amperes in approximately 0.01 second. During this time, due to the increasing resistance of the electrode extension as it heats, the voltage rises to between 4—6 volts. When the fuse break occurs, the arc voltage rises instantaneously to approximately 28 volts, which is the static voltage of the generator at the arc current plus the voltage of selfinductance and thereafter decays exponentially in the next 0.025 seconds to approximately 24 volts while the current decays exponentially from approximately 300 amperes to 1000 amperes.

In FIG. 2, curves $c$ and $d$ show the voltages and currents respectively, which curves show that just before the short circuit, the voltage and arc current are approximately the same as in FIG. 1. At the moment of short circuit, the voltage again drops to approximately zero and the current rises exponentially to 450 amperes. When the fuse break occurs, the voltage rises to 28 volts and the current in the next 0.01 second decays from 450 amperes to 80 amperes and the process then repeats itself.

Several fundamental phenomena are evident as a result of a study of these two oscillograms. As the electrodes in both instances are advancing at the same speed, the time required for the newly established end of the electrode to come into contact with the weld pool is an indication of the location of the fuse break. Thus, in FIG. 1 the relatively long arcing time indicates that the fuse break occurred in the extension, not in the droplet. Also, the relatively high arc current and the relatively long arc period create problems in the control of the weld. Heat is added to the weld puddle during the arc period, and this high average current and long time period make the puddle too hot and, thus, too fluid. Furthermore, the high arc current in the small diameter electrode leads to $I^2R$ heating in the electrode extension and this is conducive to the formation of a much larger droplet on the end of the electrode which only compounds the difficulties when the next short occurs. Thus, with a large droplet the area of contact with the electrode end is larger and the heating due to the short circuit current occurs more readily in the electrode extension than in the droplet. Also, the weld pool has a cooling effect on the droplet and with the larger droplet this cooling effect is greater.

In FIG. 2 the short circuit current rises to a peak substantially higher than the 300 amperes required to cause the fuse break. This is due to the fact that the fuse break requires a finite time to occur because of the mechanical forces involved and the current, because of the high rate of current rise, considerably overshoots this required amount.

Also, FIG. 2 shows that because the current decays exponentially from a much higher value than is necessary to cause the fuse break, the average current during the arcing period is still higher than necessary to maintain the arc. This higher average arc current causes problems with the fluidity of the weld pool. It is, of course, possible to reduce the open circuit voltage of the power source so that the arc pops out prior to the occurrence of the next short circuit with a resultant shorter arcing period. This improves the control of the weld pool, but spatter still remains a problem. It will thus be seen that for each welding application it is possible to balance the spatter problem and the heat introduced to the weld pool by appropriately selecting a power source having a rate of current rise which will satisfy the particular conditions of the welding operation. This may also be done by providing a single power source and adjusting its internal inductance or by providing a power source with a high rate of current rise and adding inductance in its output circuit.

Various ways have been proposed in the past to overcome these problems and provide a relatively spatter-free welding operation with proper control of the weld pool temperature.

U.S. Pat. No. 2,886,696 uses a constant potential power source with an open circuit voltage less than that required to sustain the arc and then adjusts the inductance of the circuit relative to the welding current so that the induced voltage maintains the arc and the number of short circuits occurring each second is in excess of 50 and usually above 100. This method involves careful correlating of the inductance and arc current which sometimes is critical and difficult for the operator in the field to adjust. Also, because the peak short circuit current is high, the average current is necessarily high.

In an effort to reduce this average current, this patent also proposes to either further lower the inductance or the open circuit voltage so that the arc actually goes out between short circuits. This results in an uneven or lumpy weld bead or, even worse, "cold shuts," i.e. where the weld bead is not fully fused to the workpiece.

U.S. Pat. No. 3,071,680 provides a DC keep alive power source which maintains an arc at a relatively low arc current sufficient to form a molten droplet on the end of the advancing electrode. A supplementary power source in parallel therewith supplies a series of current pulses of a high enough current to cause the molten droplets formed by the keep alive arc to be pinched off and transferred to the weld pool by spray transfer. These pulses are provided at sufficiently close intervals that the molten droplet forming on the end of the electrode never has time to contact the molten weld pool and thus short circuit the keep alive power supply. These pulses tend to overheat the weld pool. Also, transfer of metal to the weld pool is difficult in out-of-position welding.

U.S. Pat. No. 3,249,735 is somewhat similar to Pat. No. 3,071,680 except that in some embodiments an impedance is placed in series with the welding electrode which is then periodically shorted out so as to result in a periodic spray transfer of the weld metal to the weld pool without creating a high enough average current to overheat the weld pool.

In the case of these last two patents, the number of high current pulses is repeated at a fixed frequency, usually either line frequency or a multiple thereof. This is done by making the supplementary power source an alternating current transformer having either half wave or full wave rectification and without using any filtering in the output of the rectifiers.

While the optimum machine parameters have been pointed out above for a shorting type transfer, the machine parameters which are best for welding which involves a continuous arc are quite different and the paradox involved in the design of a welder which will perform properly in all welding processes will be developed below.

Generally the machine parameters for a welder supplying power for the shorting transfer are low inductance, constant voltage output in the order of 15 to 50 volts, and either artificial or natural means to limit short circuit current during a shorting transfer. The machine parameters for cored electrodes in which transfer is free flight and continuous arc are similar but short circuit current and inductance are not as critical and usually higher values of both are desirable. Whereas, the machine parameters for stick and submerged arc welding are quite different in that open circuit voltages in the order of 60—100 volts are needed, relatively high inductance is beneficial and the volt ampere characteristic is quite drooping.

A simple approach to achieving all these characteristics in one machine is not possible.

The present invention contemplates an electric arc welding supply having apparent characteristics which satisfy the requirements demanded of it by whatever welding process it is supplying at the moment. In achieving such a machine, a new welding process is generated.

THE INVENTION

The present invention provides a power supply which overcomes all of the above difficulties and others, is relatively inexpensive to manufacture, and enables the production of high quality welds in downhand or out-of-position welding with a minimum of spatter.

In accordance with the broadest aspects of the invention a power supply for arc welding is provided comprised of a power source having a relatively low short circuit current rate of rise in combination with means for substantially increasing this rate of rise when the output of the power source is short circuited and reducing it when the fuse break occurs.

In accordance with the aspect of the invention, a power supply for automatic welding of the drop transfer type is provided comprised of paralleled principal and supplementary power sources, the principal power source supplying a relatively constant current which rises slowly or not at all when the droplet contacts the weld pool and decays slowly or not at all after the arc is reestablished. The supplementary power source however supplies no or low current during arcing. When the droplet contacts the weld pool, the current rises very rapidly to cause a fuse break. When the fuse break occurs, the current drops immediately to zero. In effect, the supplemental power supply supplies short pulses of current sufficient to, but only long enough to cause a fuse break.

Further in accordance with the invention, the supplemental power source has a maximum short circuit current related to the electrode diameter and to the current being supplied by the principal power source such as to limit the maximum short circuit current to that required to at least cause the fuse break but with the minimum of spatter. This may be done by designing the supplemental source to be self limiting or by placing an impedance in series therewith.

More specifically, in accordance with the invention, a power supply for automatic electric arc welding is provided comprised of a principal power source having a relatively constant static voltage output and a short circuit rate of current rise below 60,000 amperes per second, in parallel with a supplementary power source having a short circuit rate of current rise in excess of 60,000 amperes per second, the open circuit voltage of the latter plus its maximum inductive voltage being at least less and preferably several volts less than the open circuit voltage of the former plus its maximum inductive voltage.

Although it is possible to weld with both power sources having a short circuit current rate of rise in the neighborhood of 60,000 amperes per second, the benefits of the invention increase as the differences in the rates of rise increase. In particular, the benefits of the invention increase as the short circuit current rate of rise of the principal source is lowered to be between 40,000 and 15,000 amperes per second and the rate of rise of the supplemental source increases above 100,000 amperes per second.

The relative instantaneous output voltage of the two power sources during welding are important insofar as successful operation of the invention is concerned. These voltages must be such that the supplementary source is supplying the principal amounts of current to the electrode during the time the short circuit exists and a minimum or zero current during the time the arc exists.

When the arc exists this voltage relationship may be obtained by relatively adjusting the open circuit voltages of the two power sources taking into account that the instantaneous voltage output of each during the time the arc exists is the open circuit voltage plus the inductive voltage. So long as: the sum of the open circuit voltage and the inductive voltage of the supplementary source is less than the sum of the open circuit voltage and inductive voltage of the principal source, this condition will prevail.

The maximum inductive voltage of a power source having a short circuit current rate of rise between 15,000 and 40,000 amperes per second is approximately 8—10 volts while that of a power source having a short circuit current rate of rise between 100,000 and 1,000,000 amperes per second is approximately 3 volts.

When the short circuit exists (while so termed, actually it has some impedance) there will be a small voltage at the parallel terminals of the two power sources. The currents in these two power sources divide essentially in proportion to the internal generated voltage of each power source less the voltage drops in their internal impedances. The division can be readily determined by measuring the actual instantaneous current supplied by each power source during the short circuit.

Thus it is possible for a principal power source having a high internal generated voltage and a high internal impedance to function in combination with a supplemental power source having a much lower internal generated voltage and a very low internal impedance. For example, a principal power source with an open circuit voltage of 30 volts and an instantaneous short circuited terminal voltage of 3 volts could function with a supplemental power source having an open circuit voltage of 6 volts and an instantaneous short circuited terminal voltage of 4 volts although a much smaller difference of internal generated voltages is contemplated in preferred embodiments of the invention.

Also in accordance with the invention, a method of drop transfer type electric arc welding is provided comprising the steps of continuously energizing the electrode from a principal power source having a relatively low short circuit current rate of rise less than 60,000 amperes per second and during the short circuits when the molten drop contacts the molten weld pool, energizing the electrode with a short circuit current rate of rise in excess of 60,000 amperes per second.

Also in accordance with the invention, a method of drop transfer type electric arc welding is provided comprising the steps of continuously energizing the electrode from a principal power source having a relatively low short circuit current rate of rise less than 60,000 amperes per second and during the short circuits when the molten drop contacts the molten weld pool, additionally energizing the electrode from a supplemental power source having a short circuit current rate of rise in excess of 60,000 amperes per second.

The machine parameters thus satisfy the dual requirements of welding processes based on constant voltage welding supplies. The continuous arc of the electrode is supplied by that portion of the source having a higher inductance; whereas, the shorting transfer demands current of both sources depending on its instantaneous needs, and their needs are automatically met because of the relationship of the open circuit voltages and the relative inductances of each circuit.

OBJECTS OF INVENTION

The principal object of the invention is the provision of a new and improved power supply for electric arc welding of the drop transfer type which enables improved welds to be readily obtained in either the downhand or out-of-position welding and thin sheet metal.

A further object of the invention is the provision of a new and improved power supply for electric arc welding of the drop transfer type which has less spatter than heretofore.

Another object of the invention is the provision of a new and improved power supply for electric arc welding of the drop transfer type which enables the average arc current to be maintained at lower values than heretofore while still obtaining satisfactory welds.

Still another object of the invention is the provision of a new and improved power supply for electric arc welding of the drop transfer type which enables maintaining a lower weld pool temperature.

Still another object of the invention is the provision of a new and improved power supply for electric arc welding of the drop transfer type including two power sources, one which supplies the current during the existence of the arc and a second which supplies a pulse of current when the droplet contacts the weld pool.

Still another object of the invention is the provision of a new and improved power supply for electric arc welding which has improved arc starting capabilities.

Still another object of the invention is the provision of a new and improved power supply for electric arc welding wherein when the arc is initially started, the power supply provides a high initial pulse of current to rapidly establish an arc gap at the point of contact with the workpiece.

Still another object of the invention is the provision of a new and improved power supply for electric arc welding comprised of two power sources, one of which provides the current during the arcing and the other of which automatically provides a pulse of current when the electrode end contacts the weld pool.

Another object of the invention is a welding power supply which enables welding to be carried out using a lower average arc current but which quickly reestablishes the arc when the droplet shorts to the weld pool.

Another object is a welding power supply made up of two power sources having internal inductances and open circuit voltages so interrelated that they are automatically switched on to supply current as the arc conditions instantaneously change.

Another object of the invention is the provision of a new and improved method of arc welding of the drop transfer type wherein one power source supplies a generally constant current during both the periods of arcing and short circuits but when the short circuit occurs, a second power supply supplies a pulse of current sufficient to break the short circuit quickly and reestablish the arc.

The invention may take physical form in certain parts and arrangement of parts, preferred embodiments of which will be described in detail in this specification and illustrated in the accompanying drawings which form a part hereof and wherein:

FIGS. 1 and 2, previously referred to, are voltage and current oscillograms on a greatly enlarged time base of drop transfer type electric arc welding showing the instantaneous currents and voltages when using a power supply having a short circuit rate of current rise of 70,000 amperes per second and 100,000 amperes per second, respectively;

PREFERRED EMBODIMENT

Figures 3, 4:
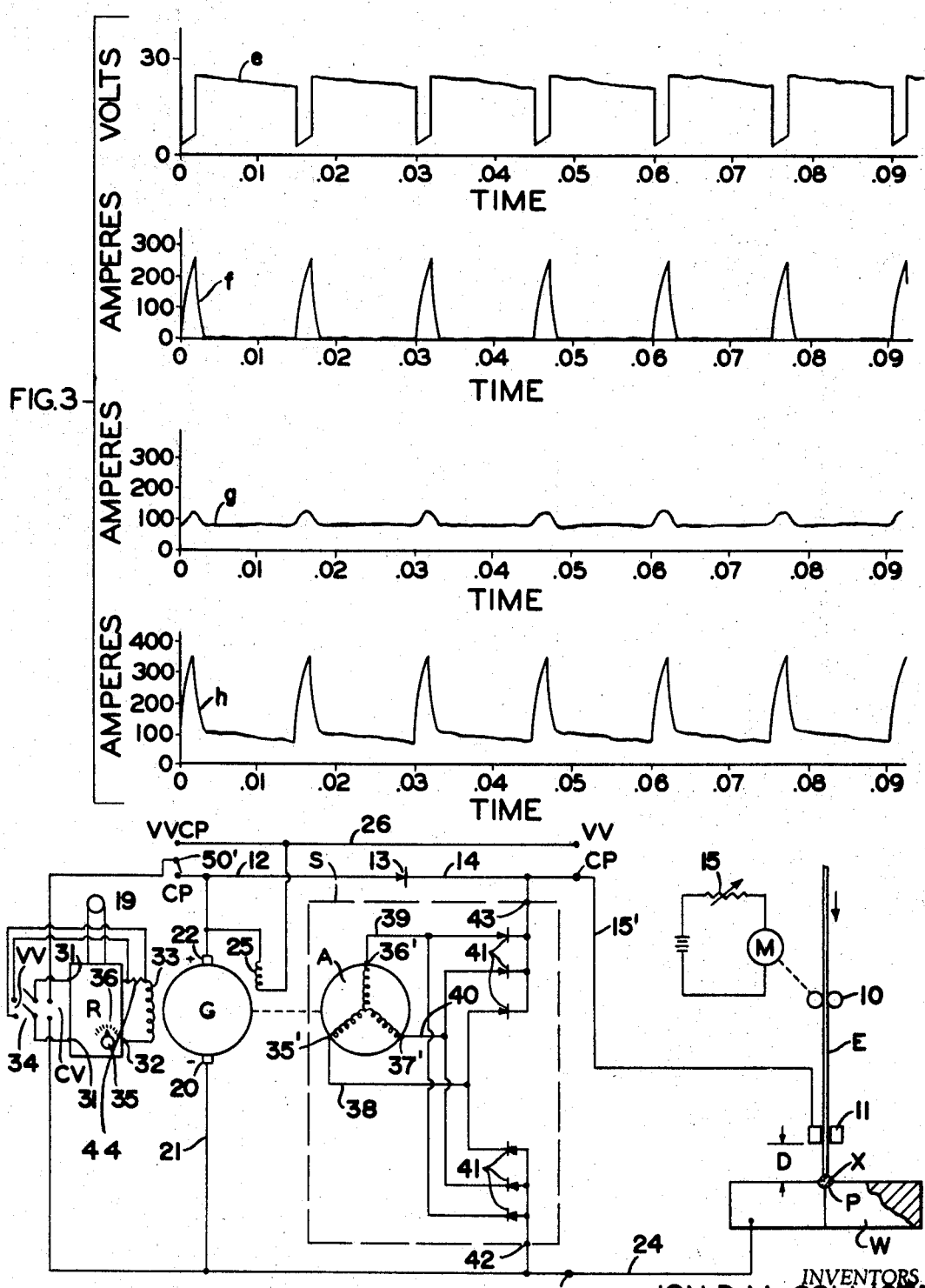
FIG. 3 is an oscillogram similar to those of FIGS. 1 and 2 showing the instantaneous current and voltages using the present invention.
FIG. 4 is a diagram somewhat schematic of a power supply illustrating a preferred embodiment of the invention.

Referring now to the drawings wherein the showings are for the purpose of illustrating a preferred embodiment of the invention only and not for the purposes of limiting same, FIG. 4 shows a first or primary power source G, a second or supplementary power source S, both connected to supply electric current between an electrode E and a workpiece W. The electrode E is a wire of indeterminate length and is fed towards the workpiece W by a pair of conventional feed rolls 10, driven as is conventional by an electric motor M. The electrode E moves past sliding contacts 11 spaced a distance D from the workpiece W and an arc X is maintained between the end of the electrode E and the workpiece W, which arc both melts off the end of the electrode E and melts a weld pool P on the surface of the workpiece W. The workpiece W is shown as having its upper surface horizontal and the electrode E is shown as advancing in a perpendicular direction. Obviously, the electrode E may have any desired angle relative to the surface of the workpiece and the surface of the workpiece may have any desired angle relative to horizontal.

The distance $D$ will in automatic welding be fixed and in semiautomatic arc welding will usually be maintained as accurately as the welding operator can maintain this distance. The distance $D$ in practice may vary from ¼ inch to 1¾ inch although it can be greater.

The electrode E may be of any desired metal, e.g. aluminum, stainless steel, high alloy steel, but in the preferred embodiment is low carbon steel. The current carrying cross section may be as desired 0.0005 sq. in. to 0.005 sq. in. but preferably in the order of 0.001 sq. in. The voltages, currents, and dimensions set forth herein are all in relation to the preferred embodiment.

The motor M is energized as is conventional from a suitable power source, preferably of constant voltage, through a variable impedance 15 so that its speed of rotation can be readily varied but once set will remain constant. Obviously the speed of the motor can be made to vary proportionally to the average voltage across the arc gap X or in some instances in proportion to the average current in the arc gap X, as is disclosed in an application of Theodore Ashton, Ser. No. 678,094, filed Oct. 25, 1967.

The first power source G has one terminal 20 connected to workpiece W through conductor 21, terminal CT and power lead 24 and a second terminal 22 connected to the welding electrode E through conductor 12, diode 13, wire 14, terminal CP and power lead 15′. Terminal 22 also connects through series differential windings 25 to wire 26 to terminal VV which will be referred to hereinafter.

The power source G in a preferred embodiment and in accordance with the invention, has an output circuit voltage adjustable preferably between 15 and 55 volts, which voltage remains substantially constant at any adjusted value with variations in the steady state current in the output. Additionally, the power source G has sufficient inductance, internal or external or both, as to have a short circuit rate of current rise below 60,000 and preferably between 15,000 and 40,000 amperes per second.

The power source G may take any one of a number of different forms, e.g. batteries plus an inductance, rectified alternating current plus an inductance or direct current from a rotating generator having sufficient internal inductance or having an external inductance or both. A rotating DC generator is preferred wherein the armature reactance and internal inductance is such as to give the desired rate of short circuit current rise.

It is to be noted that in conventional constant potential welding used heretofore the maximum open circuit voltage of a rotating direct current generator has been on the order of 30 volts. such a generator normally has a short circuit current rate of rise in excess of 70,000 amperes per second which is too high for use as the first or primary power source with the present invention. It is preferred, therefore, to use a rotating current generator having a maximum open circuit voltage with full field excitation on the order of 90 volts and to excite the field only in an amount sufficient to provide the desired output voltage.

In the preferred embodiment, the power source G is a standard SAE 400 motor-driven generator manufacture by the assignee of this application and having consequent pole shunt excitation capable of an open circuit voltage greater than 90 volts when excited to a saturation factor of 1.3. Such a generator when operated at 15—55 volts open circuit has a rate of rise of short circuit current between 15,000 and 40,000 amperes per second. Such a generator operates on the linear portion of the saturation curve and flat compounding to provide constant potential output is virtually impossible. Thus, means are provided for automatically adjusting the field excitation so as to hold the average output voltage constant. In the embodiment shown, a voltage regulator R is provided energized from an AC power source 19 and having sensing terminals 31 connected through the CV position of a two-pole double throw switch 34 to terminal 20, and through the CP position of a switch 50' to terminal 22 of the generator G. The regulator R has output terminals 32 connected to the filed pole windings 33 of the power source G. The regulator R has a pointed control member 35 and voltage calibrated dial 36 adjusting its output and thus the output voltage of the generator G. The regulator R includes electronic amplifying means and has the capability of sensing the average output voltage of the power source G and regulating the current in the field windings 33 so as to maintain this average voltage substantially constant at any preset value despite changes in the average output current of the power source G. The regulator R is insensitive to the instantaneous voltage changes. The exact circuit diagram of the regulator R forms no part of the present invention and will not be described further herein. A preferred regulator is described in application Ser. No. 733,497 filed on May 31, 1968, now U.S. Pat. No. 3,505,587.

Figure 5:
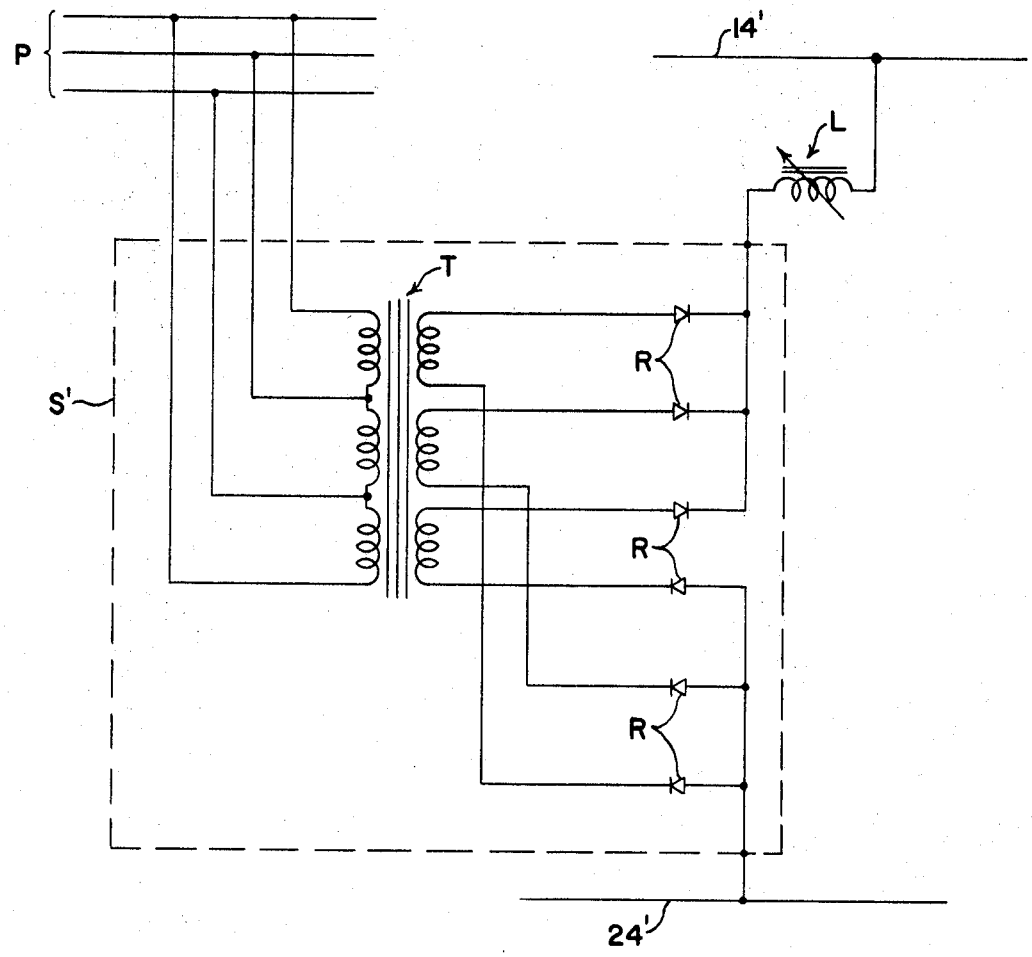
FIG. 5 is a schematic diagram of a modification of the second power source portion of the power supply of FIG. 4.

The primary function of the supplementary power source S is in effect to change the short circuit current rate of rise to a desired value substantially above that of the principal power source. It can be any means which provides the required high short circuit current rate of rise. Such means may take a number of different forms. The form is a DC generator having a low internal inductance, an alternating current transformer, the output of which is rectified, as illustrated in FIG. 5, or an alternator, the output of which is rectified. In the event of a transformer or alternator, full wave rectification should be used and preferably the AC should be multiphase. In the event single phase alternating current is used, some means, either artificial or natural, must be provided to prevent the voltage from falling to zero. Artificial filtering cannot contain inductance. Otherwise, the rate of rise of the current might be adversely affected. Thus, it is preferred to use polyphase transformers or alternators as a source of AC and in the preferred embodiment the power source S includes a polyphase alternator A having a rotor mounted on the same shaft as the rotor of the power source G and field coils mounted in the same housing. The alternator A has three output terminals 35', 36', 37' connected by wires 38, 39, 40 to the input terminals of six diodes 41 connected in a conventional bridge rectifier circuit and having an output terminal 42 connected to the wire 24 and thus the workpiece W and a second output terminal 43 connected to the wire 14 and thus to the electrode E. The polarity of the output of the bridge rectifier is the same as the polarity of the generator G. When not welding the diode 13 prevents current from the source S circulating through source G when source G has an open circuit voltage less than that of source S. In some instances the diode 13 can be replaced by a switch which is closed only during welding which may result in a slight circulating current from the supplemental source through the principal source but this is not detrimental. In fact, it stabilizes the supplemental source by placing a constant load thereon.

As mentioned above, the second power source may be in the form of a polyphase transformer having a rectified output, as illustrated in FIG. 5. More particularly, with reference to FIG. 5, a second power source S' includes transformer T having an input from a power source P and an output through rectifiers R to lines 14' and 24' corresponding, respectively, to lines 14 and 24 of FIG. 4 leading to electrode E and workpiece W. A variable impedance L may be provided in series with the transformer-rectifier combination for limiting the maximum short circuit current to the electrode.

In the preferred embodiment the volt-ampere curve of the source S is substantially flat to currents on the order of 350-—500 amperes when it drops off rapidly to effect a current limiting action during short circuit and limit or prevent weld spatter.

This limiting may of course be achieved in a number of different ways. The alternator A of the preferred embodiment is designed to have a full load current at the desired maximum short circuit current. The voltage output then inherently drops off rapidly beyond this maximum current. A small resistance in series with its output could also be used. Such a resistance is particularly desirable where the supplemental source S is not self-limiting such as with a transformer-rectifier combination or constant potential DC generator or the like. Also a series resistance may be used where it is desired to be able to readily change the maximum short circuit current.

FIG. 3 is an oscillogram showing the results obtainable using the present invention. Thus, curve $e$ shows the instantaneous arc voltage; curve $f$ shows the current supplied by the supplemental power source; curve $g$ shows the current supplied by the primary source; and curve $h$ shows the total current supplied to the electrode. These curves show that just prior to the short circuit, the arc voltage is approximately 22 volts, the current in the supplemental power source is zero (approximately zero), the current in the primary power source and the total current is approximately 80 amperes. When the short circuit occurs, the current in the supplementary power source rises in approximately 0.0020 seconds to a value of 250 amperes; the current in the same length of time in the primary power source rises from 80 to 120 amperes, and, the total current rises from 80 amperes to 370 amperes. When the fuse break occurs at the end of 0.0020 seconds and the arc is reestablished, the current in the supplemental power source is shutoff while the current in the primary source falls exponentially from 120 amperes to 80 amperes during the period of arcing. The average current during the time the arc exists is approximately 100 amperes.

Thus, the principal source furnishes a generally constant current because of its high inductance while the supplementary source furnishes a high, but limited, current sufficient to cause the fuse break to occur very quickly. This latter current flow is limited in duration only by the time required to cause the fuse break and is accurately called a current pulse.

Switching the supplemental power source on and off so as to supply this current pulse takes place automatically. It is switched on when the short circuit occurs and the voltage at the electrode falls below the source S output voltage. It is switched off when the arc is reestablished because at this instant, the instantaneous voltage of the principal source instantaneously rises above the supplemental source instantaneous voltage. It is to be emphasized, however, that no physical switch is required. The alternator A having essentially no inductance in its circuit has a maximum open circuit voltage less than the arc voltage so that it furnishes no current during arc time. During the shorted period, the principal generator has so much inductance its current increases only a slight amount whereas the supplementary source having no inductance furnishes current to its limited capacity.

Figure 1:
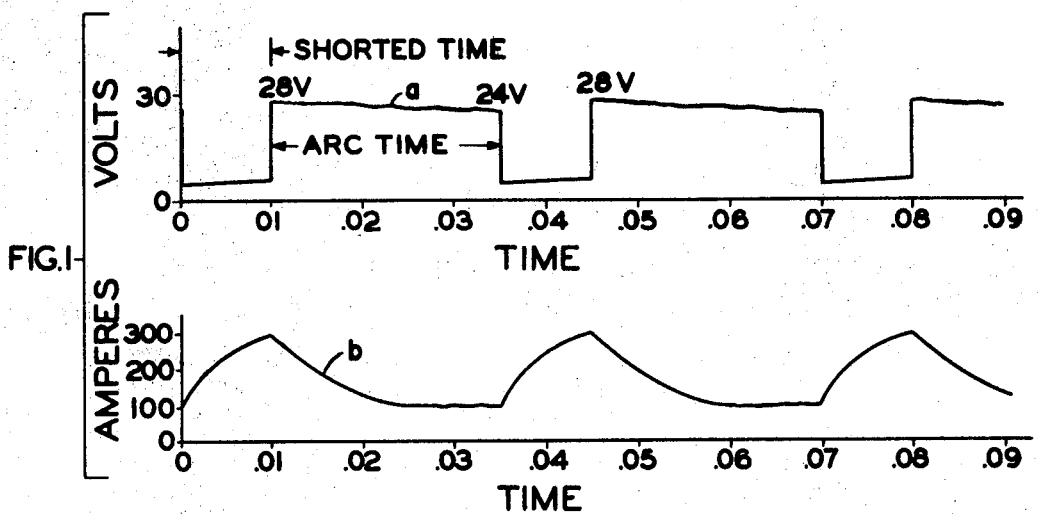
Figure 2:
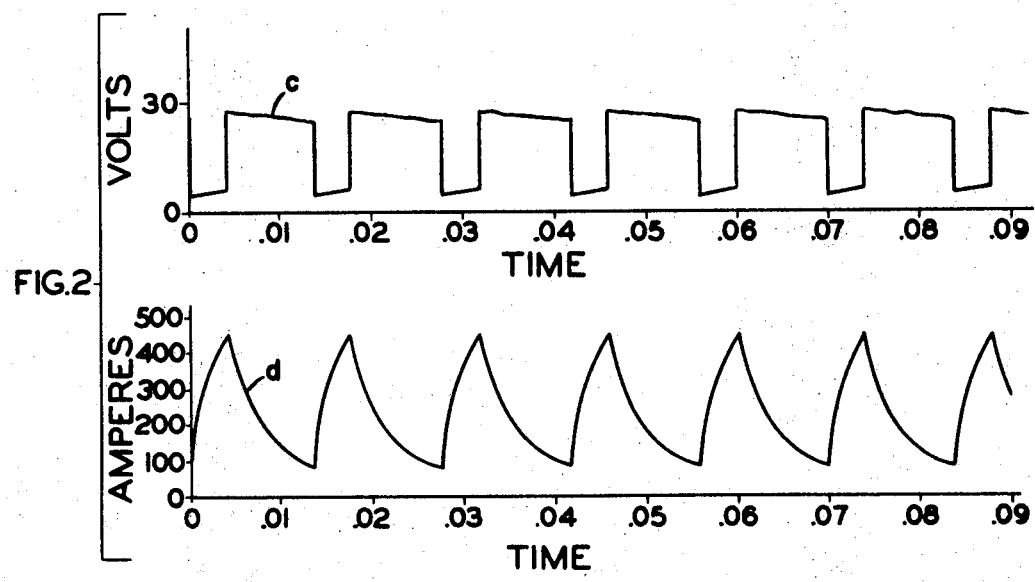

Comparing the oscillograms of FIG. 3 with those of FIGS. 1 and 2, it is to be noted that the short circuit frequency of FIG. 3 is at the rate of about one every 0.016 seconds, i.e., 60 per second, which is substantially more frequently than those shown in FIG. 1 and approximately the same as those shown in FIG. 2. Additionally in FIG. 3, the ratio of the short circuit to the time of one cycle is 1 to 8 whereas in the example of FIG. 1, the ratio is approximately 1 to 3.5 and in FIG. 2 the ratio is approximately 1 to 3.

Further, the short circuit period of FIG. 3 is less than the short circuit period of FIG. 2 although it can be made to be the same. Also, the maximum short circuit current of FIG. 3 does not exceed 350 amperes, thus limiting the spatter at the time of the fuse break. The arcing time is as long as or longer than that of FIG. 2. Furthermore, the current during the principal portion of the arcing period is substantially constant and not the result of an exponential decline from the peak current of 370 amperes. It is of further interest to note that the frequency of the current pulse is not a fixed frequency as is the case with the prior art where two power sources are employed, with one being pulsed at a fixed frequency, but instead, is a natural frequency determined by the number of times that the molten droplet shorts the electrode of the weld pool.

By choosing the relative voltages of the principal and supplemental power sources, the level of the background or constant current in the arc as supplied by the principal power source can be chosen as well as the level of contribution to the welding current by the supplemental power source.

The advantages of such a welding system become evident where particularly critical welds are to be made. For example, when welding on thin gauge material, the control of heat during the arcing period is possible by means of controlling the level of the background current from the principal power source. Presently used power sources must either accept the high average level of background current due to the exponential decay of the current, or force an interruption of the arc current by lowering the inductance of the power source so that the arc actually goes out between short circuits. Under less critical conditions, a reduction of spatter, as well as an optimum balance of heat can be obtained for increased welding speeds.

The present invention is also of value in starting the arc. At the moment the advancing cold electrode touches the workpiece the point of highest resistance is at the point of contact. Because the electrode is constantly advancing, this resistance will drop rapidly as it is pressed against the workpiece. The current from the supplementary power source rises at a rate in excess of 200,000 amperes per second to a value high enough and in a sufficiently brief period of time that before the electrode has had a chance to advance an appreciable distance toward the workpiece, the current is high enough to cause the fuse break at the point of greatest resistance namely, the point of contact.

The power supply illustrated is readily usable for welding operations requiring variable (or drooping) voltage output by simply connecting the power lead 15 to the terminal VV rather than terminal CP such that the welding current now flows through the series differential field winding 25. Additionally, the switch 34 is shifted to the VV position shown such as to connect the sensing terminals 31 of the voltage regulator R across a resistor 44 in series with the field windings 33. The control member 35 is then adjusted so that the current flowing in the field windings will provide the desired open circuit voltage. When the generator is supplying a variable voltage, the supplemental power source is completely inactive.

It is to be noted that with this arrangement the generator G will supply substantially the same open circuit voltage regardless of line voltage variations or internal variations in the generator G due to heating or the like.

Alternatively for some welding processes, as is described in the application of Theodore Ashton, Ser. No. 678,094 filed Oct. 25, 1967 the sensing terminals 31 may be connected across terminals VV and CT by placing switch 34 in the CV position and switch 50' in the VVCP position. The generator G when so connected has the dynamic characteristics of a variable voltage generator but with a constant static voltage output with static current variations. With this arrangement the static output voltage may be preset by the knob 35 and calibrated dial 36 to any desired value and maintained at this level during welding.

DEFINITIONS

Inductance as used herein, unless otherwise stated, means the total inductance of the power source either external or internal plus the inductance of the power leads to the electrode.

Open circuit voltage is the voltage delivered by a power source when not delivering current.

Instantaneous voltage is the voltage across the arc which would be read on an oscilloscope or the oscillograph of a high speed recorder with a greatly expanded time base.

Average voltage is that which would be read on a d'Arsonval type meter, incapable of following the rapid pulsations in the voltage caused by the alternate short circuits and arc periods.

Instantaneous current is that which would be read on an oscilloscope or the oscillograph of a high speed recorder having a greatly expanded time base.

Average current is that which would be read on a d'Arsonval meter incapable of following the rapid pulsations of the current in each cycle.

Short circuit current rate of rise is the slope of the portion of the current curve at the instant that a short circuit is imposed across the terminals of a power source having an open circuit voltage of 30 volts or the maximum static open circuit voltage if it is less than 30 volts, it being appreciated that this curve is exponential in shaped and its slope decreases with time from the instant of the imposing of the short circuit. For practical purposes the rise in current for the first 0.001 second multiplied by 1000 will be close enough. Thus, a generator having a short circuit current rate of rise of 100,000 amperes per second will rise 100 amperes in 0.001 second, although at the end of 0.003 seconds, the current will only be 250 amperes. It is further to be noted that the current, if the short circuit is maintained for a prolonged period of time is the maximum short circuit current of the power source.

When the cross-sectional area of an electrode is given, it is intended to include a solid wire or the current carrying section of a cored or tubular electrode.

Using the present invention, improved starting characteristics of the arc have been readily obtained. Once the arc is started, the welding proceeds smoothly with a minimum spatter and the weld pool temperature remains sufficiently low that out-of-position welding and, in particular, overhead welding is readily done.

The invention has been described with reference to a preferred embodiment. Obviously, modifications and alterations will occur to others upon a reading and understanding of this specification and it is our intention to include all such modifications and alterations insofar as they come within the scope of the appended claims.

We claim:

1. In an arc welding system having a power supply for automatic electric arc welding wherein an arc is maintained and a droplet on the end of an electrode periodically contacts the weld pool and shorts the power supply, said supply including first and second DC power sources each having a pair of output terminals with like polarities interconnected and connected one to said electrode and the other to a workpiece to be welded, the improvement which comprises said first power source having a generally constant voltage output with variations in current and a short circuit current rate of rise less than 60,000 amperes per second, said second power source having a short circuit current rate of rise in excess of 60,000 amperes per second, said first power source having a voltage output to maintain an arc between said electrode and said workpiece sufficient to melt the workpiece and the electrode, whereby a drop forms on the end of the electrode, said second power source having a generally constant voltage output with variations in current up to the maximum current such as to supply no or a minimum of current when an arc exists between said electrode and said workpiece, but sufficient to supply current to said electrode when said drop still on the end of the electrode contacts the weld pool.

2. The improvement of claim 1 wherein said second power source includes means for limiting the maximum short circuit current to less than 500 amperes.

3. The improvement of claim 1 wherein said first power source has a short circuit current rate of rise between 15,000 and 40,000 amperes per second.

4. The improvement of claim 1 wherein said second power source has a short circuit current rate of rise between 100,000 and 1,000,000 amperes per second.

5. The improvement of claim 1 wherein said first and second power sources have static voltage outputs which remain essentially constant as the output current is increased up to currents approaching the maximum current rating of each.

6. The improvement of claim 1 wherein said power source is a rotating direct current generator having output terminals and a maximum open circuit voltage greater than 75 volts when excited to a saturation factor of 1.3, said second power source is a multiphase alternator on the same shaft as said rotating generator and having its output terminals connected to the input terminals of a full wave rectifier, the output terminals of said rectifier being connected to the output terminals of said generator.

7. The improvement of claim 6 wherein said first poser source includes an armature and series differential windings, and means for energizing the generator output terminals directly from said armature.

8. The improvement of claim 7 wherein a voltage regulator has output terminals connected to the field coils of said generator and sensing input terminals connected directly across said armature.

9. The improvement of claim 1 wherein said second power source is an alternator rectifier combination.

10. The improvement of claim 1 wherein said second power source is a transformer rectifier combination.

11. The improvement of claim 10 wherein means in the form of an impedance is provided in series with said combination for limiting the maximum short circuit current to the electrodes.

12. In an arc welding system having a power supply for electric arc welding wherein an arc is maintained between an electrode and a workpiece and a droplet on the end of the electrode periodically contacts the weld pool and shorts the power supply, said supply including at least a DC power source having a pair of output terminals connected one to said electrode and the other to the workpiece to be welded, said power source having a generally flat volt-ampere curve and a short circuit current rate of rise less than 60,000 amperes per second and a voltage output and current rating sufficient to melt the workpiece and form a weld pool and melt the electrode and form a drop on the end of the electrode which periodically contacts the weld pool, the improvement which comprises: a second power source having a pair of output terminals connected one to said electrode and one to said workpiece with the same polarity as said first supply and having a substantially flat volt ampere curve and short circuit current rate of rise to in excess of 60,000 amperes per second when said drop contacts said weld pool.

13. The improvement of claim 12 wherein said second power source increases the short circuit current rate of rise to an amount in excess of 100,000 amperes per second.

14. The improvement of claim 12 wherein said second power source includes means for limiting the maximum short circuit current to an amount less than 500 amperes.

15. In an arc welding system for welding a workpiece with a continuously fed electrode energized from a power supply and using drop transfer type metal transfer wherein an arc melts the workpiece and forms a drop on the end of the electrode which drop periodically contacts the weld pool and short circuits the power supply, and includes:

power means for feeding said electrode toward a workpiece,
said power supply for electrically energizing said electrode relative to said workpiece includes first and second DC power sources, each having a pair of output terminals with like polarities connected one to said electrode and the other to said workpiece;

The improvement which comprises:
said first power source having a constant voltage output which remains essentially constant as the output current is increased and a short circuit current rate of rise less than 60,000 amperes per second,
said second source having a constant voltage output which remains essentially constant as the output current is increased and a short circuit current rate of rise in excess of 60,000 amperes per second,
said first power source having a voltage output to maintain an arc between said electrode and said workpiece sufficient to melt the workpiece and the electrode whereby a drop forms on the end of the electrode,
said second power source having a voltage output such as to supply no or a minimum of current when an arc exists between said electrode and said workpiece, but sufficient to supply a pulse of current to said electrode when said drop still on the end of the electrode contacts the weld pool.

16. The improvement of claim 15 wherein;
said first power source has a short circuit current rate of rise less than 40,000 amperes per second, and,
said second power source has a short circuit rate of rise in excess of 100,000 amperes per second.

17. A method of electric arc welding wherein an electrode of indefinite length is continuously advanced toward a workpiece to be welded and an arc is maintained between the end of the electrode and the workpiece which melts the workpiece and forms a weld pool and melts the end of the electrode and forms a droplet thereon and the droplet transfers periodically to the weld pool by contacting the weld pool and shorting the electrode to the weld pool, comprising: continuously energizing said electrode from a first power source having a short circuit current rate of rise less than 60,000 amperes per second and during shorts of the droplet to the weld pool additionally energizing said electrode from a second power source having a short circuit current rate of rise in excess of 60,000 amperes per second and a generally flat volt ampere curve up to its maximum current rating in an amount sufficient to break the short circuit.

18. The method of claim 17 wherein said first power source has a rate of rise less than 40,000 amperes per second and said second power source has a rate of rise in excess of 100,000 amperes per second.

19. A method of electric arc welding wherein an electrode of indefinite length is continuously advanced toward a workpiece to be welded and an arc is maintained between the end of the electrode and the workpiece which melts the workpiece and forms a weld pool and melts the end of the electrode and forms a droplet thereon and the droplet transfers periodically to the weld pool by contacting the weld pool and shorting the electrode to the weld pool, comprising: continuously energizing said electrode from a constant voltage output power source having a short circuit rate of rise less than 60,000 amperes per second, and during shorts of the droplet to the weld pool increasing the rate of rise to in excess of 60,000 amperes per second by means of a second constant output voltage source so as to rapidly increase the current in an amount sufficient to break the short circuit more rapidly than it would be broken by the first mentioned rate of current rise.

20. The improvement of claim 19 including the step of limiting the maximum short circuit current to less than 500 amperes.